United States Patent [19]
Watanabe et al.

[11] Patent Number: 5,794,071
[45] Date of Patent: Aug. 11, 1998

[54] DATA PROCESSING SYSTEM

[75] Inventors: Hiromi Watanabe, Mitaka; Atsushi Kiuchi, Kunitachi; Yuji Hatano, Kodaira, all of Japan

[73] Assignee: Hitachi, Ltd., Tokyo, Japan

[21] Appl. No.: 510,500

[22] Filed: Aug. 2, 1995

[30] Foreign Application Priority Data

Aug. 2, 1994 [JP] Japan ................... 6-181096

[51] Int. Cl.$^6$ ...................... G06F 13/00
[52] U.S. Cl. .............. 395/847; 395/291; 364/240; 711/169
[58] Field of Search ............. 364/514 R, 243, 364/240, 259, 228.3, 238.6, 240.2, 222.2, 229.2, 281.1–238.4, 260, 260.3; 395/800, 134, 143, 501, 507–509, 511, 520–521, 200.83, 287, 840–847; 711/169

[56] References Cited

U.S. PATENT DOCUMENTS

| | | | |
|---|---|---|---|
| 4,674,034 | 6/1987 | Iwashita | 711/169 |
| 4,791,598 | 12/1988 | Liou et al. | 364/725 |
| 4,912,636 | 3/1990 | Mager et al. | 364/243 |
| 5,046,023 | 9/1991 | Katsura et al. | 345/434 |
| 5,191,647 | 3/1993 | Masaki | 395/501 |
| 5,265,228 | 11/1993 | Beaudoin et al. | 364/240 |
| 5,276,845 | 1/1994 | Takayama | 364/242.3 |
| 5,349,549 | 9/1994 | Tsutsui | 364/725 |
| 5,412,488 | 5/1995 | Ogata | 358/455 |
| 5,477,469 | 12/1995 | Motomura | 364/514 R |

OTHER PUBLICATIONS

*IEEE*, "A Versatile and Powerful Chip for Real Time Motion Estimation", A. Artieri, et al., V2.9, 1989.

Information Technology—Generic Coding of Moving Pictures and Associated Audio, Recommendation H.262, ISO/IEC 13818–2, Draft International Standard, ISO/IEC JTC1/SC29/WG11 N0702 rev., Incorporating N702 Delta of 24 Mar., 1994.

*IEEE 1993 Custom Integrated Circuits Conference*, A Half–Pel Precision Motion Estimation Processor For NTSC–Resolution Video, S. Uramoto, et al.

*Primary Examiner*—Emanuel T. Voeltz
*Assistant Examiner*—Bryan Bui
*Attorney, Agent, or Firm*—Antonelli, Terry, Stout, & Kraus, LLP

[57] ABSTRACT

A data processing system being constructed such that the amount of time a data bus of a data processor is occupied to perform predetermined data processing operations is reduced. The data processing system includes a data processor for processing data, a first memory for storing data, a second memory for storing data, a dedicated data processing circuit for performing a predetermined data processing operation on data, a data bus and first and second dedicated buses. The data bus is connected to said data processor and the first and second memories and transfers processed data from the data processor to the first memory and from the second memory to the data processor. The first dedicated bus is independent of the data bus and is connected to the circuit and the first memory and transfers processed data from the first memory to the circuit. The second dedicated bus is independent of the data bus, is connected to the circuit and the second memory and transfers data operated on by the circuit from the circuit to the second memory.

69 Claims, 11 Drawing Sheets

DATA PROCESSING SYSTEM

BACKGROUND OF THE INVENTION

The present invention relates to a data processing system having a dedicated data processing circuit which may be embodied as a data encoder for compressing data, a data decoder for uncompressing the data, or a circuit for editing the data. More particularly, the present invention relates to a data processing system having independent and dedicated buses for operating with the dedicated data processing circuit to reduce the amount of time the data bus of the data processor of the data processing system is occupied due to processing being performed by the dedicated data processing circuit.

A known general-purpose data processing system, which has its processing unit composed mainly of an arithmetic logic unit (ALU) 124, a multiplier (MPY) 126 and an accumulator (ACC) 125, is equipped with a dedicated data processing circuit for causing the data processing system to operate at higher processing speeds. As shown in FIG. 12, for example, the known data processing system when processing an image signal is provided with a discrete cosine transformer (DCT) circuit 126 (i.e., a circuit frequently used for encoding the image signal highly efficiently for transforming the image signal into a frequency component) as the dedicated data processing circuit.

Moreover, there is disclosed in Japanese Patent Laid-Open No. 60-159973 an image processing system which is equipped with a plurality of processor elements 134 and 135 and memory elements 132 and 133 to be operated simultaneously but independently of one another and a plurality of independent buses 136, 137, 138 and 139 for connecting those elements, as shown in FIG. 13.

In known data processing system, as shown in FIG. 12, the processing speed for processing data is increased by pipeline processing between the processing unit (ALU 124, MPY 123 and ACC 125) and the dedicated processing circuit. However, such processing occupies the data bus 12 a high percentage of the time, thereby requiring data to be fed at a high speed to the data bus.

In the image processing system as shown in FIG. 13, processing speed is increased and parallelism of the elements of the system are strengthened by arranging a plurality of dedicated data buses. However, in such a system the instructions for switching controls of the data buses, for inputting/outputting the data to the dedicated data processing circuit and for controlling the requests for operations to be performed by the system have to be incorporated into the instruction set of the processor, thereby effecting ease of use and flexibility of the system.

SUMMARY OF THE INVENTION

An object of the present invention is to provide a data processing system having a dedicated data processing circuit which may operate to encode, compress, uncompress or edit data.

Another object of the present invention is to provide a data processing system having independent and dedicated buses for operating with a dedicated data processing circuit to reduce the amount of time the data bus of the data processor of the data processing system is occupied due to processing being performed by the dedicated data processing circuit.

The data processing system of the present invention includes a data processor for processing data, a first memory for storing data, a second memory for storing data, a dedicated data processing circuit for performing a predetermined operation on data, and first, second and third buses. The first bus is connected to the data processor and the first and second memories so as to transfer processed data from the data processor to the first memory and transfer the data from the second memory to the data processor. The second bus is independent of the first bus and is connected to the dedicated data processing circuit and the first memory. The second bus transfers processed data from the first memory to the dedicated data processing circuit. The third bus is independent of the first bus and is connected to the dedicated data processing circuit and the second memory. The third bus transfers data operated on by the dedicated data processing circuit from the dedicated data processing circuit to the second memory.

The data processing system of the present invention can also have a circuit construction including a plurality of dedicated data processing circuits. In the present invention the first one of the plural dedicated data processing circuits is connected to the first memory and the last of the plural dedicated data processing circuits is connected to the first and second memory. The first and second memories are connected to the first bus so as to be controlled by the data processor. Memory is provided between each pair of dedicated data processing circuits such that output data processed by one dedicated processing circuit of the pair of dedicated data processing circuits can be employed as input data to the other dedicated processing circuit of the pair of dedicated data processing circuits.

A serial port can be provided between each pair of dedicated processing circuits as part of the output port of the memory connected between the pair of dedicated data processing circuits. The serial port permits output data processed by one dedicated data processing circuit of the pair stored in the memory to be sequentially output as input data to the other dedicated data processing circuit of the pair.

The serial port described above can be provided as part of the input port of the memory connected between each pair of dedicated processing circuits.

The first and second memories and the memories connected between each pair of dedicated data processing circuits can be provided as parts of a single storage unit. Also for each of the first and second memories and the memories connected between each pair of dedicated data processing circuits dual memories can be provided that operate in the flip-flop mode so as to permit the simultaneous inputting and outputting of data.

In the data processing system of the present invention a request for starting or halting operation of a dedicated data processing circuit or exchanging information such as an operating parameter or operating state of the dedicated data processing circuit is carried out by writing or reading out data to or from a register address by the data processor. The register is memory mapped into the address space of the data processor. Also a functional change can be made in the dedicated data processing circuit as required by using an Field Programmable Gate Array (FPGA) as a rewritable device in the dedicated data processing circuit. Further, a specified layout position of the dedicated data processing circuit on a semiconductor chip can be provided to permit ease in composing the layout of a dedicated data processing circuit on the chip.

In the data processing system of the present invention, the data to be processed by the dedicated data processing circuit are fed from the first memory controlled by the data processor through the second bus independent of the data bus of the data processor. The data bus is the first bus described above. The data processed by the dedicated data processing circuit is outputted to the second memory controlled by the processor through a third bus also independent of the data bus of the data processor.

When plural dedicated data processing circuits are used, at least two dedicated data processing circuits constituting one pair of dedicated data processing circuits is provided. The pair of dedicated data processing circuits forming part of the data processing system are laid out in a particular manner on a chip. The data processed by the first dedicated data processing circuit of the pair of dedicated data processing circuits are fed as input data of the second dedicated data processing circuit through the memory connected between the pair. The memory is controlled by the data processor.

An interface between the second one of a pair of dedicated data processing circuits and the memory connected between the pair of dedicated data processing circuits and controlled by the data processor is provided as a serial port so that data is sequentially read/written to/from the memory in response to a demand from the second one of the pair of dedicated data processing circuits.

In the data processing system of the present invention, each of the first and second memories and the memories connected between pairs of dedicated data processing circuits controlled by the data processing system is given two memory units at a common address so that in case one memory unit is connected with the data bus of the data processor or to one dedicated data processing circuit of a pair, the other memory unit can be connected to the dedicated data processing circuit or the other dedicated data processing circuit of the pair respectively.

The request for starting or halting operation of the dedicated data processing circuit or exchanging information such as the operating parameter or operating state of the dedicated data processing circuit is carried out by writing or reading out data to or from a register controlled by the data processor at one of addresses on the memory map of the data processor. Also the operation of the dedicated data processing circuit can be freely changed according to the application of the data processing system or as required due to changes that may occur during operation of the data processing system by using a rewritable device in the dedicated data processing circuit.

In the data processing system according to the present invention, by limiting the layout position of the dedicated data processing circuit on the chip in advance, any change in the dedicated data processing circuit can be made, as necessary, without changing the layout of other portions of the data processing system.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
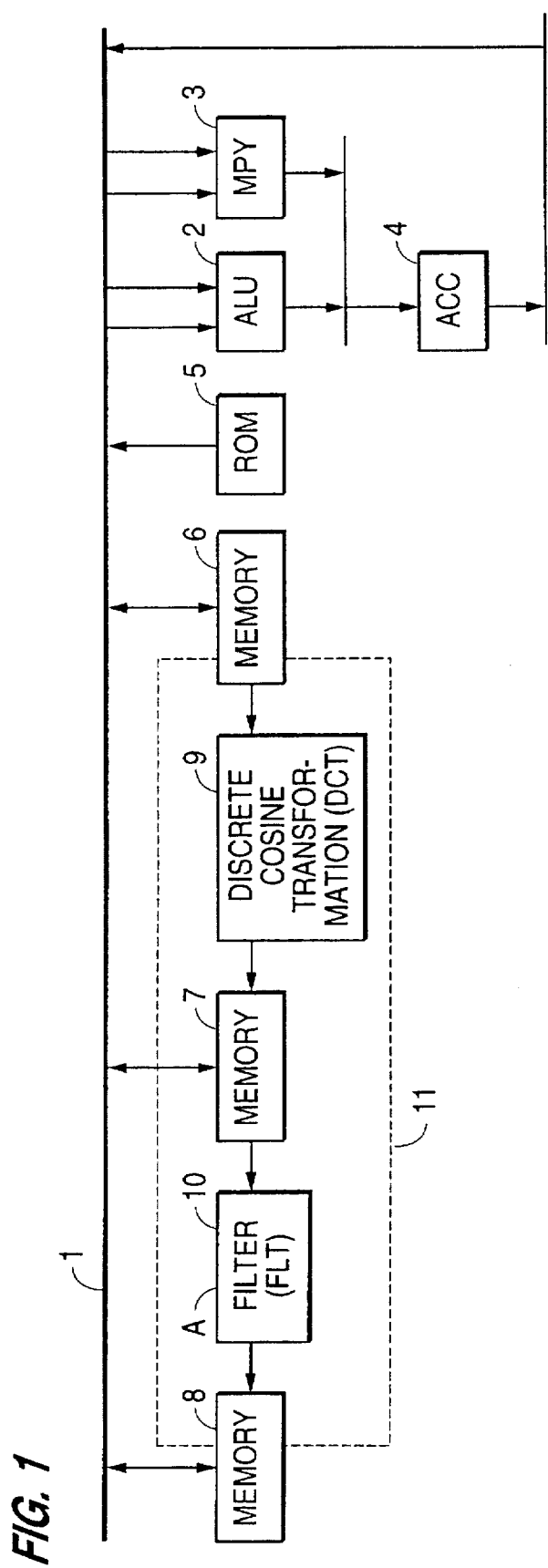
FIG. 1 is a diagram of a basic construction of a processing unit of a data processing system according to one embodiment of the present invention.

An embodiment of the present invention is shown in FIG. 1. FIG. 1 illustrates a basic construction of a processing unit of a data processing system of the present invention by exemplifying an image signal processing, especially image signal encoding. The present invention is not limited in its application to only image signal processing. The system of the present invention may be used for performing any other processing where dedicated circuitry is provided. Thus, the description of the present invention relative to FIG. 1 is for illustrative purposes only.

The data processor of the present embodiment is basically constructed to comprise an arithmetic logic unit (ALU) 2 and an accumulator (ACC) 4. The data processor of FIG. 1 is equipped with not-shown instruction memory (e.g., ROM or RAM) storing instructions and is constructed such that the ALU 2 performs arbitrary processing operations such as adding, subtracting or shifting operations in accordance with the instructions stored in the instruction memory so that the operated results are stored in the ACC 4 or a register connected with the ALU 2. Since the ALU 2 is capable of performing a variety of processing operations in accordance with the instructions, it is suitable for the case in which processing operations including different processed contents are to be executed. Moreover, since the data processor is constructed to store the processed results in the ACC 4, it is suitable for the case in which a subsequent processed content changes with the processed result of the ALU 2 or where a subsequent processing operation is performed by making use of the processed result of the ALU 2.

The data processor further includes a multiplier (MPY) 3 for performing multiplying operations, and a ROM 5 to be used for storing a processing coefficient such as a quantization coefficient or for data transformations. In the case of encoding image data, generally a great number of multiplications such as quantizations or inverse quantizations are required so that an efficient image processing can be achieved by incorporating the multiplier 3 into the processor.

The data processing system of the present invention has its circuit constructed to further include data storing memories 6, 7 and 8, a discrete cosine transformation (DCT) circuit 9 connected between memories 6 and 7 for discrete cosine transformations, and a filter circuit (FLT) 10 for processing by filtering the image data. The DCT 9 and FLT 10 along with memory 7 form the dedicated data processing circuit 11.

As shown in FIG. 1, the image data to be read out of the data memory 6 and inputted to the DCT circuit 9 are provided by a first dedicated bus connected between the data memory 6 and the DCT circuit 9. The first dedicated bus is independent of a data bus 1 of the data processor. The image data processed by the DCT circuit 9 are provided to the memory 7 different from the memory 6, which has been used for the inputting operation, by a second dedicated bus connected between the DCT circuit 9 and the memory 7. The second dedicated bus is independent of the data bus 1 of the data processor. The image data of the memory 7 are provided to the FLT circuit 10 by a third dedicated bus which is independent of the data bus 1 of the data processor, and the image data processed by the FLT circuit 10 is provided to memory 8 by a fourth dedicated bus independent of the data bus 1 of the data processor.

With this construction, the dedicated data processing circuit 11 and the memories 6, 7 and 8 are connected through the buses which are independent of the data bus 1 of the data processor so that the percentage of time the data bus 1 is occupied can be reduced. Moreover, the inputting/outputting of the image data to be utilized in the dedicated data processing circuit 11 are wholly effected through memories 6, 7 and 8 so that the dedicated data processing circuit 11 and the processing unit of the data processing system are made highly independent.

For conveniences of description, there is exemplified the example of encoding the image signals. However, the present invention can also be applied to the case of decoding image signals. In case the image signals are to be decoded, for example, a circuit for an inverse discrete cosine transformation (IDCT) and a circuit for a motion compensation can also be arranged in place of the DCT circuit 9 and the FLT circuit 10 to construct an image signal decoding system. In this construction, like FIG. 1, the data inputting memory 6 and the IDCT circuit are connected through the first dedicated bus which is independent of the data bus of the data processor, and the IDCT circuit is connected with the outputting memory 7 through the second dedicated bus whereas the motion compensating circuit is likewise connected with an inputting memory (e.g., the outputting memory 7 of the IDCT circuit) by a third dedicated bus and to the outputting memory 8 through a fourth dedicated bus. When the motion compensating circuit is provided as part of the dedicated data processing circuit, a memory for storing reference image data is necessary for motion compensation. By dividing the memory space of inputting memory 7 of the motion compensating circuit into two wherein one memory space stores the transformed result of the IDCT circuit and the other memory space stores the reference image data a single shared memory can be provided.

Even in the case of encoding image signals, the dedicated data processing circuit can be changed according to the kind of the encoding processing. In the case of encoding a motion image using motion detection and the discrete cosine transformation, for example, a motion estimate circuit and the DCT circuit can be arranged in place of the DCT circuit 9 and the FLT circuit 10. In this construction, as in FIG. 1, the inputting memory 6 of the motion estimate circuit and the motion estimate circuit may be connected through the first dedicated bus independent of the data bus 1 of the data processor, whereas the outputting memory 7 of the motion estimate circuit and the motion estimate circuit may be connected through a second dedicated bus. Further, the DCT circuit and its inputting memory (e.g., the outputting memory 7 of the motion estimate circuit) are connected through a third dedicated bus, and the DCT circuit and its outputting memory 8 are connected through a fourth dedicated bus. In this case, the amount of time the data bus is occupied due to the encoding processing is reduced similar to that described above.

The dedicated data processing circuit, although described as having the DCT circuit 9 and the FLT circuit 10, should not be limited thereto but can be applied to any variety of circuits including the aforementioned dedicated data processing circuits. The dedicated data processing circuit, which is connected with the dedicated and independent buses, as in the present invention, can be applied to any processing circuit having its processing or processed content fixed, a processing circuit for sequentially processing the input data and for outputting the processed data, or a processing circuit which has its next processed content unchanged by its own processed result but its processed result is used in another processing circuit. The aforementioned DCT circuit or IDCT circuit sequentially transforms the input image data and outputs the transformed data so that it has a relatively large processing amount. As a result, the construction is more effective if it is constructed to include the dedicated buses and the memories as in the present invention.

For ease of understanding the data memories 6, 7 and 8 are illustrated as different memories in FIG. 1. Since, however, it is sufficient that these memories can be differentiated in their spaces, they can also be implemented by dividing the memory space of a single memory. The divided spaces may be assigned respectively to the data memories 6, 7 and 8.

Figure 2:
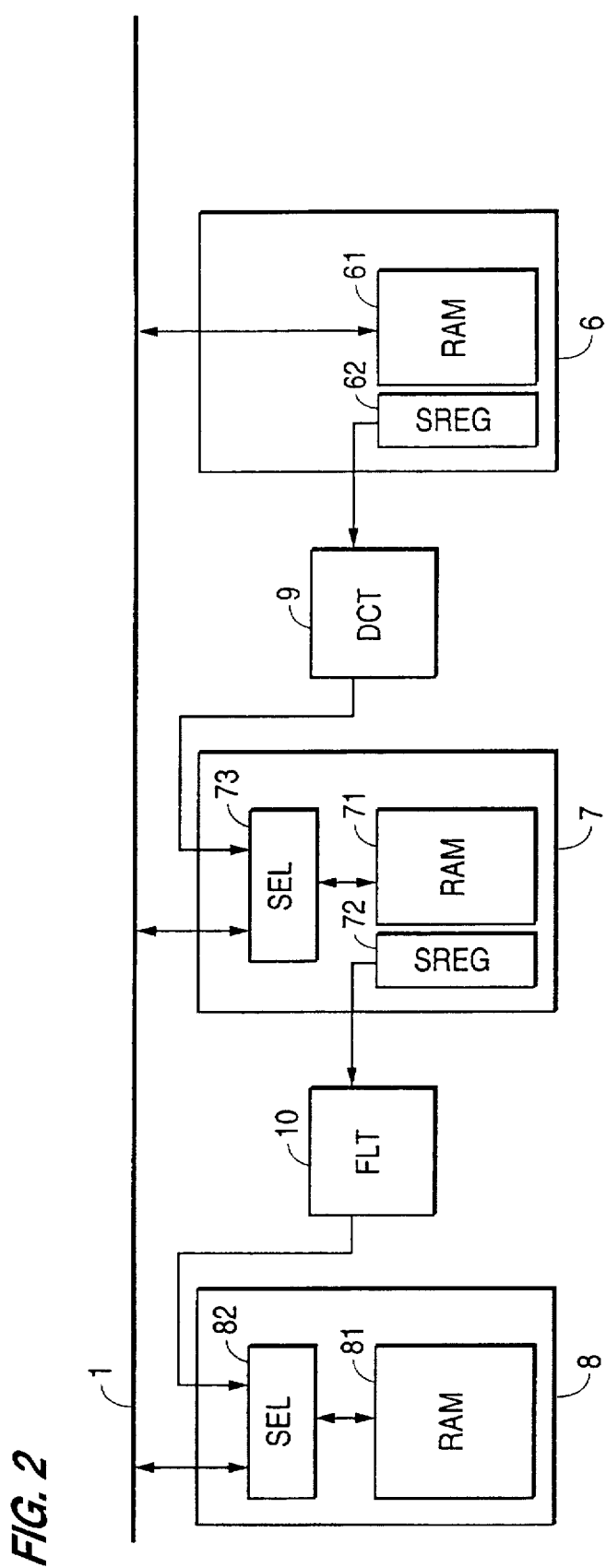
FIG. 2 is a diagram of an example of the construction of a portion of the data processing system according to the present invention.

FIG. 2 shows an example of the construction of the present invention. In this embodiment a serial port is used in the output interface of the data memory memories 6 and 7 with the dedicated data processing circuit 11.

The data memory 6 is constructed to have a random port connected with the data bus 1 and a serial port connected with the DCT circuit 9 acting as part of the dedicated data processing circuit 11. On the other hand, the data memory 7 has a random port to receive the data from the DCT circuit 9 or to be connected with the data bus 1 through a selector 73. The data memory 7 further has a serial port connected with the FLT circuit 10 acting as part of the dedicated data processing circuit 11. The data memory 8 has a random port to receive the data from the FLT circuit 10 or to be connected with the data bus 1 through a selector 82. In this embodiment, the dedicated data processing circuit 11 is constructed to have only the DCT circuit 9 and the FLT circuit 10 so that the data memory 8 is a single-port memory having no serial port for output.

In specific operations, the image data processed by the data processor are fed from the data bus 1 through the random port of the data memory 6 and written in a RAM 61. The reason why the port to be connected with the processor is made random is that the image data to be outputted from the processor have to be address transformed before they are outputted to the RAM 61, if they have been zigzag (raster) scanned.

The RAM 61 transfers the image data in parallel in the processing sequence to the serial register 62, which outputs the image data serially through the serial port in response to a reading demand coming from the DCT circuit 9. Since the processing of the image data, especially the transformation in the DCT circuit 9 is a sequential one, the present invention is suitable because of its construction in which the data memory 6 can output the data serially.

Next, the image data (e.g., the DCT coefficient) processed in the DCT circuit 9 are fed through the selector 73 from the random port and written in a RAM 71. The present embodiment is constructed such that the connection between the image data processed by the DCT circuit 9 and the data bus 1 can be made selectably by the selector 73. This construction makes common the port for receiving the output of the DCT circuit 9 and the port for transferring the data to/from the data bus of the data processor. In order that the image data (e.g., the DCT coefficient), i.e., the DCT result may be used in the basic circuit unit of the processor for the encoding or quantization, the selector 73 is switched to connect the random port of the RAM 71 with the data bus 1 of the data processor. Since the output of the DCT circuit 9 is serial data, the port could be made serial, but the random port is adopted to afford a degree of freedom for the transfer of data to/from the data processor.

For the output of the RAM 71, as in the RAM 61, data of a plurality of bits are transferred in parallel to a serial register 72 and outputted through the serial port. The image data from the RAM 71 are inputted, as in the data memory 7, through the selector 82 to a RAM 81. This RAM 81 has its output connected with the data bus 1 from the random port through the selector 82.

In the present invention, the dedicated data processing circuit 11 terminates at the FLT circuit 10 so that the data memory 8 is not equipped with the serial output port unlike the data memory 7. When only the DCT circuit 9 is incorporated in the dedicated data processing circuit 11, it is natural that the memory at the output side of the DCT circuit 9 can have the construction of the data memory 8. In the case of a plurality of dedicated data processing circuits, the memory to be located at the most downstream point of the data processing flow has the construction of the data memory 8.

According to the present invention the image data of the RAM 71 can be filtered by the FLT circuit 10 as in the DCT operation. The filtered result can likewise be written in the RAM 71 and read out from by use of the data bus 1 of the data processor.

Figure 3:
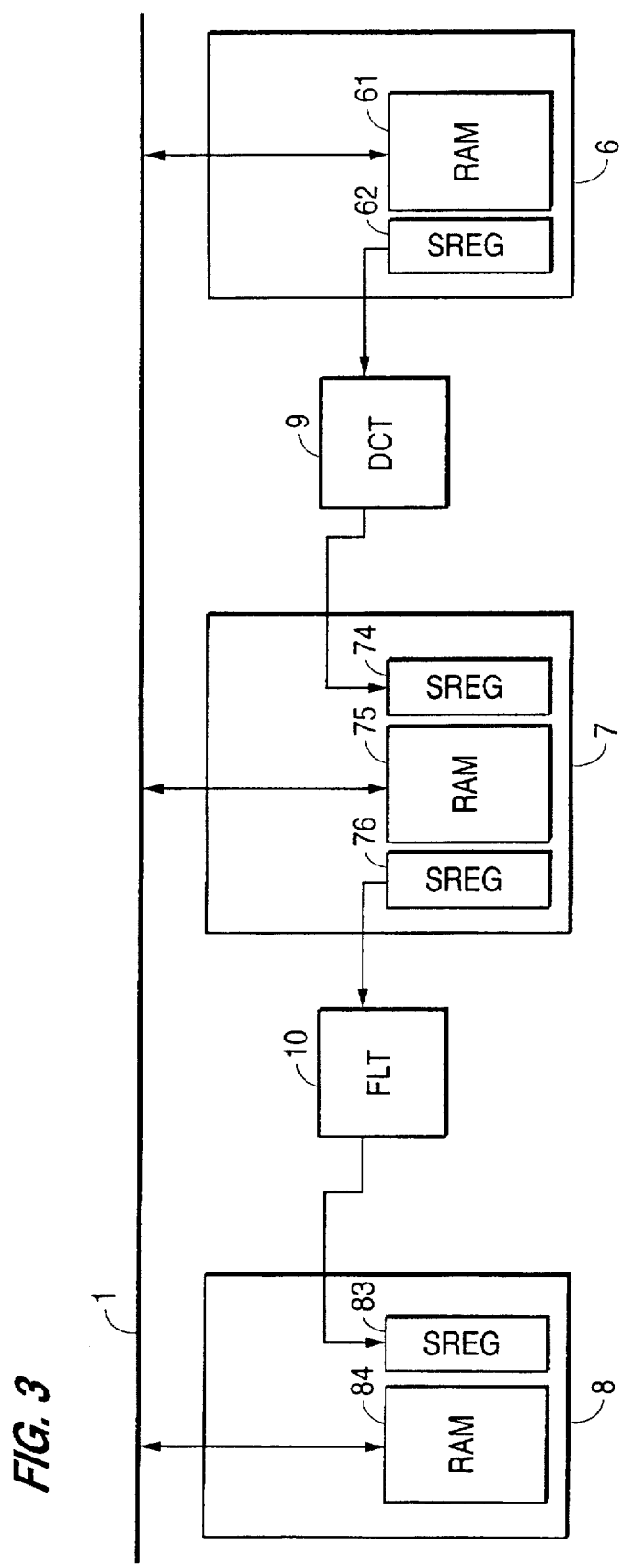
FIG. 3 is a diagram of another example of the construction of a portion of the data processing system according to the present invention.

FIG. 3 shows an embodiment using serial ports as the input/output interfaces with the dedicated data processing circuit of the data memories 6, 7 and 8. The data memory 6 has a random port connected with the data bus 1 and a serial port connected with the DCT circuit 9, as shown in FIG. 2. The data memory 7 has a serial port for receiving the image data from the DCT circuit 9 and a serial port for outputting the image data to the FLT circuit 10, and further has a random port connected with the data bus 1. The data memory 8 has a serial port for receiving the output of the FLT circuit 10 and a random port connected with the data bus 1.

In the specific operations, the image data to be DCT-processed from the data bus 1 of the processor are written in the RAM 61. This RAM 61 transfers the image data in the processing sequence to a serial register 62. The image data of the serial register 62 are sequentially read out and subjected to the DCT processing in response to a reading request of the DCT circuit 9. The image data (e.g., the DCT coefficient) thus processed are written in another memory 7. At this time, the DCT-processed image data (e.g., the DCT coefficient) are sequentially outputted and inputted to a serial register 74 in the memory. This serial register 74 transfers each stored block of a predetermined number of data elements at a time to a RAM 75 for storing therein. The image data (e.g., the DCT coefficient) stored in the RAM 75 are freely read out via the random port connected with the data bus 1 of the processor so that they can be processed in the basic circuit portion of the processor. Independently of this, the image data of the RAM 75 can be filtered by the FLT circuit 10 as in the DCT operations. The image data thus filtered by the FLT circuit 10 can also be written in the memory 8 and read out from the data bus 1 of the processor.

Figure 4:
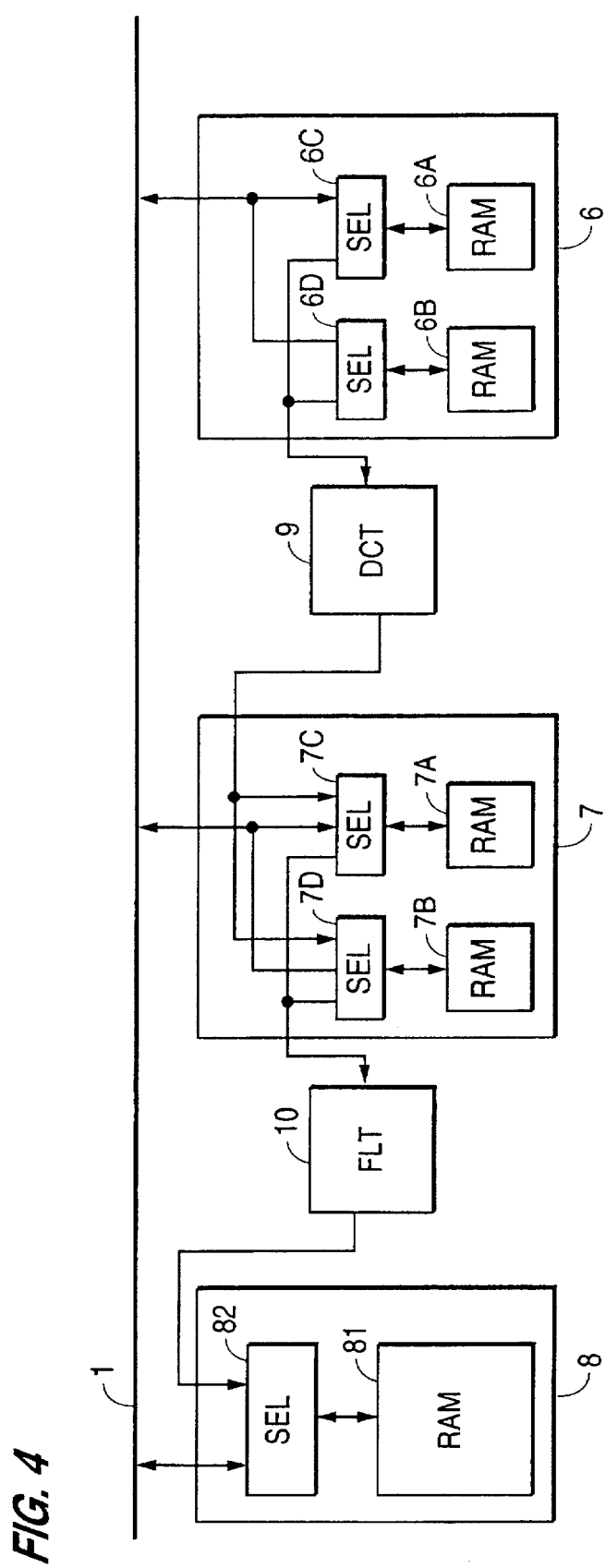
FIG. 4 is a diagram of yet another example of the construction of a portion of the data processing system according to the present invention.

FIG. 4 shows a construction in which each of data memories 6 and 7 is equipped with two RAMs. In the specific operations, the image data coming from the data bus 1 of the data processor and to be DCT-processed are written in a RAM 6A of the two, which is connected with the data bus. In case the image data are then to be processed by the DCT circuit 9, a selector 6C is switched to connect the bus connected with the data bus 1 of the data processor to the DCT circuit 9. Simultaneously with this, a selector 6D is switched to connect another RAM 6B with the data bus 1 of the processor. Image data in the RAM 6A is read by the DCT circuit 9 and DCT-processed. The image data (e.g., the DCT coefficient) thus processed are written in another memory 7. At this time, too, the processed image data (e.g., the DCT coefficient) of the DCT circuit 9 are written in one RAM 7B connected with the DCT circuit 9, whereas the other RAM 7A in the memory is connected with either the data bus 1 of the processor or the subsequent FLT circuit 10. The image data (e.g., the DCT coefficient) stored in that RAM 7B are connected by switching a selector 7D with the data bus 1 of the processor so that they can be freely read out and processed by the basic circuit portion of the data processor. Simultaneously with this, the other RAM 7A is connected with the DCT circuit 9. When the image data in the memory 7 are to be filtered by the FLT circuit 10, as for the DCT, the selector 7D switches the connection of one RAM 7B in the memory 7 to the DCT circuit 9, when the processed result of the DCT circuit 9 is to be utilized. On the other hand, when the image data to be filtered are inputted from the data bus 1 of the data processor, the selector 7D switches the RAM 7B to the data bus 1 of the data processor, and a selector 7C switches the other RAM 7A to the FLT circuit 10. Moreover, these two RAMs 7A and 7B are switched for use as in the case of the DCT circuit 9. The image data thus filtered can also be written in the memory 8 and read out from the data bus 1 by the data processor.

Figure 5:
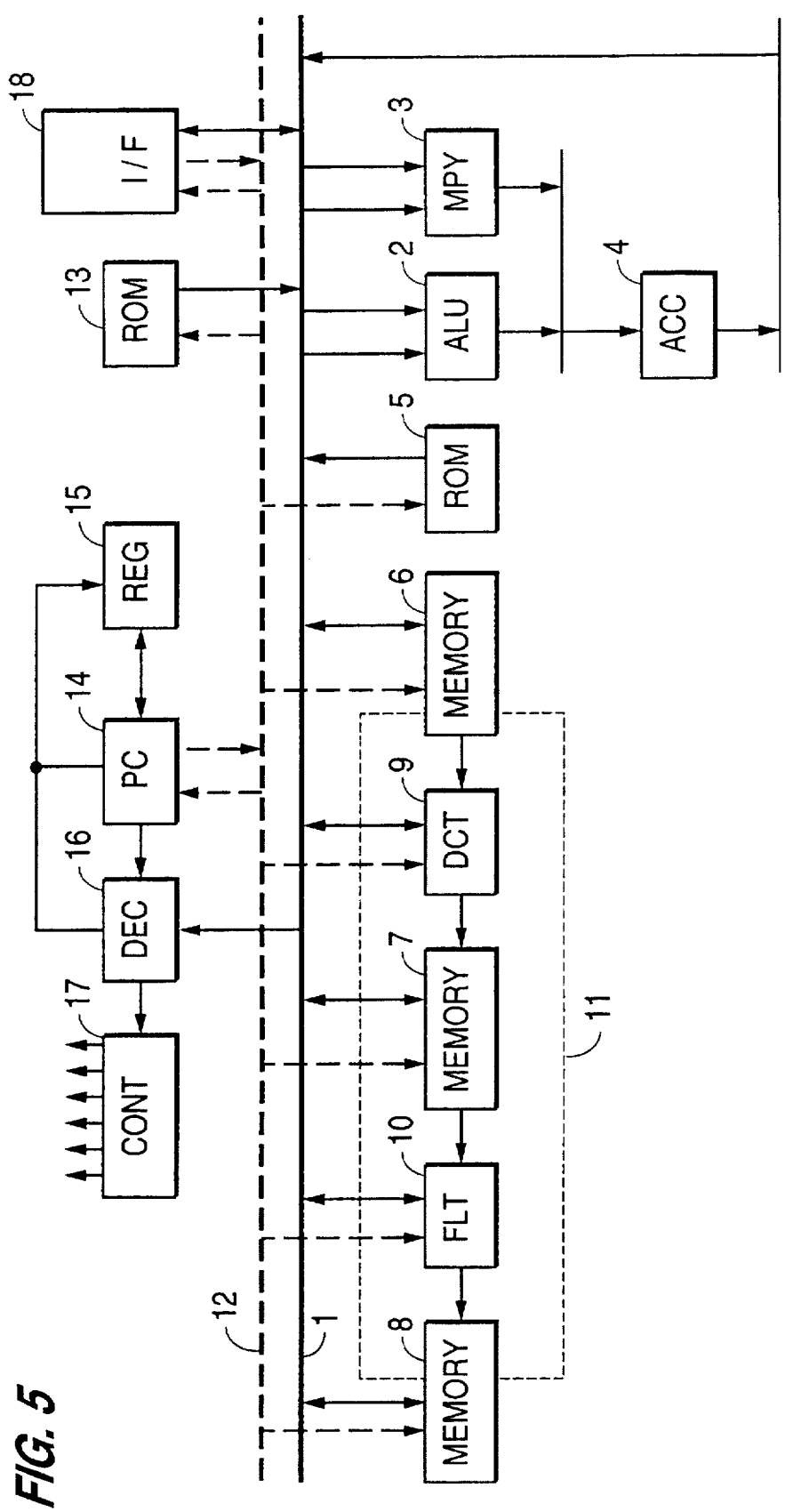
FIG. 5 is a diagram of the entire construction of a data processing system according to one embodiment of the present invention.

FIG. 5 shows the entire construction of a data processing system according to the present invention. With the dedicated data processing circuit 11 (as enclosed by dotted lines), there are connected through the data bus 1 and address bus 12, a data processor including the multiplier MPY 3, the arithmetic logic unit ALU 2, the accumulator ACC 4, the RAM 6 and the ROM 5; a processor control unit including an instruction ROM 13, a program counter PC 14, a program register REG 15, an instruction decoder DEC 16 and a control unit CONT 17; and an external interface unit I/F 18. As in FIG. 1, the data processor is basically composed of the arithmetic logic unit ALU 2 and the accumulator ACC 4. The data processor has its program executing sequence controlled by the program counter PC 14 so that the program is sequentially read out from the instruction ROM 13 in relation to the program counter PC 14. The instructions thus read out are decoded by the instruction decoder DEC 16 so that the control unit CONT 17 outputs a variety of control signals in accordance with the decoded result. These control signals control the ALU 2 and the ACC 4, and the ALU 2 performs processing operations such as the adding, subtracting and/or shifting operations in response to the control signals so that the results are stored in a register or ACC 4 connected with the ALU 2.

As in FIG. 1 the ALU 2 is so constructed that it can perform the various processing operations in accordance with the instructions. Thus, the present invention can be applied to a case in which the processing operations containing different processing contents are performed. Since the processed results are stored in the ACC 4, the present invention is also applicable to a case in which a subsequent processing content changes depending upon the processed result of the ALU 2 or in which a subsequent processing operation is performed by making use of the processed result of the ALU 2.

Figure 6:
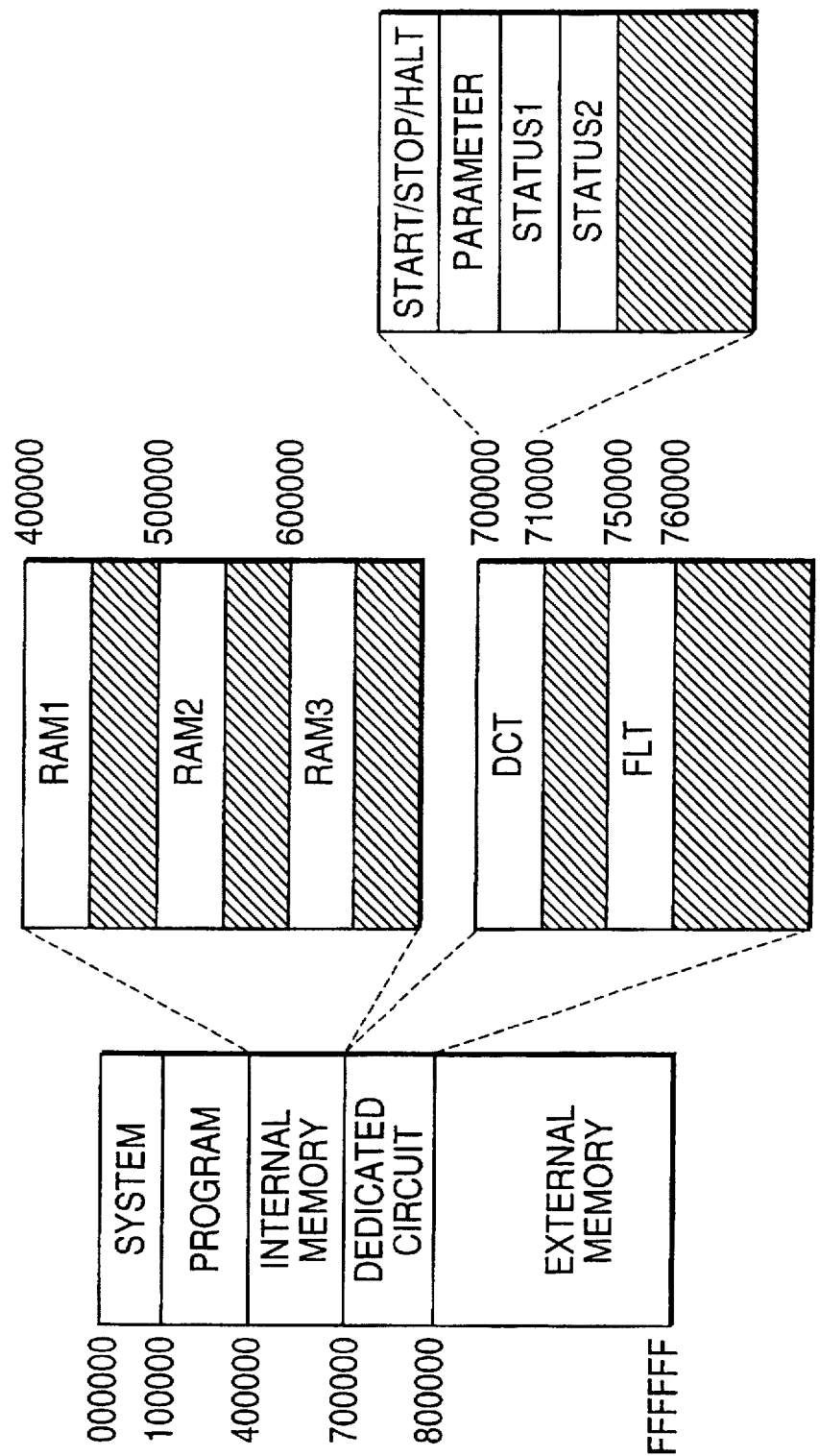
FIG. 6 is a diagram of a memory map.

The present invention is constructed according to a memory map, as illustrated in FIG. 6 representing the memory address space of the system so that the data processor can operate all elements of the system by merely addressing memory locations. Each memory address location is shown for example, as having a space of 24 bits. These memory address locations are mapped into a controlling system area (System), an operation program area (Program), an internal memory area (Internal Memory), a dedicated data circuit I/O area (Dedicated Circuit) and an external memory area (External Memory), as illustrated in FIG. 6. The internal memory area is further mapped, as illustrated, into the memory address locations for the various memories (i.e., the memories 6, 7 and 8, as shown in FIG. 5) for inputting/outputting the data to/from the dedicated data processing circuit 11.

Here, the operating instructions and the parameters for using the dedicated data processing circuit 11, and operating status data indicating the operating status of the dedicated data processing circuit 11 are also mapped, as illustrated, on the memory map of FIG. 6 so that they can be controlled by gaining access to memory address locations.

Specifically, when an address (e.g., address 700000) mapped for the dedicated data processing circuit 11 is outputted to the address bus 12, the dedicated data processing circuit 11 performs a processing corresponding to that address. When the address 700000 is so assigned as to control the start/stop/halt of the processing, the dedicated data processing circuit 11 fetches the data on the data bus in response to the address appearing in the address bus, and perform one of start, stop and halt operations in accordance with the data which is outputted to the data bus 1.

Thus, the control of the dedicated data processing circuit 11 is made by writing/reading data in/from the memory address location space on the memory map so as to enable addition and change to the dedicated data processing circuit 11 without any change in the instruction system of the data processor.

Figure 7:
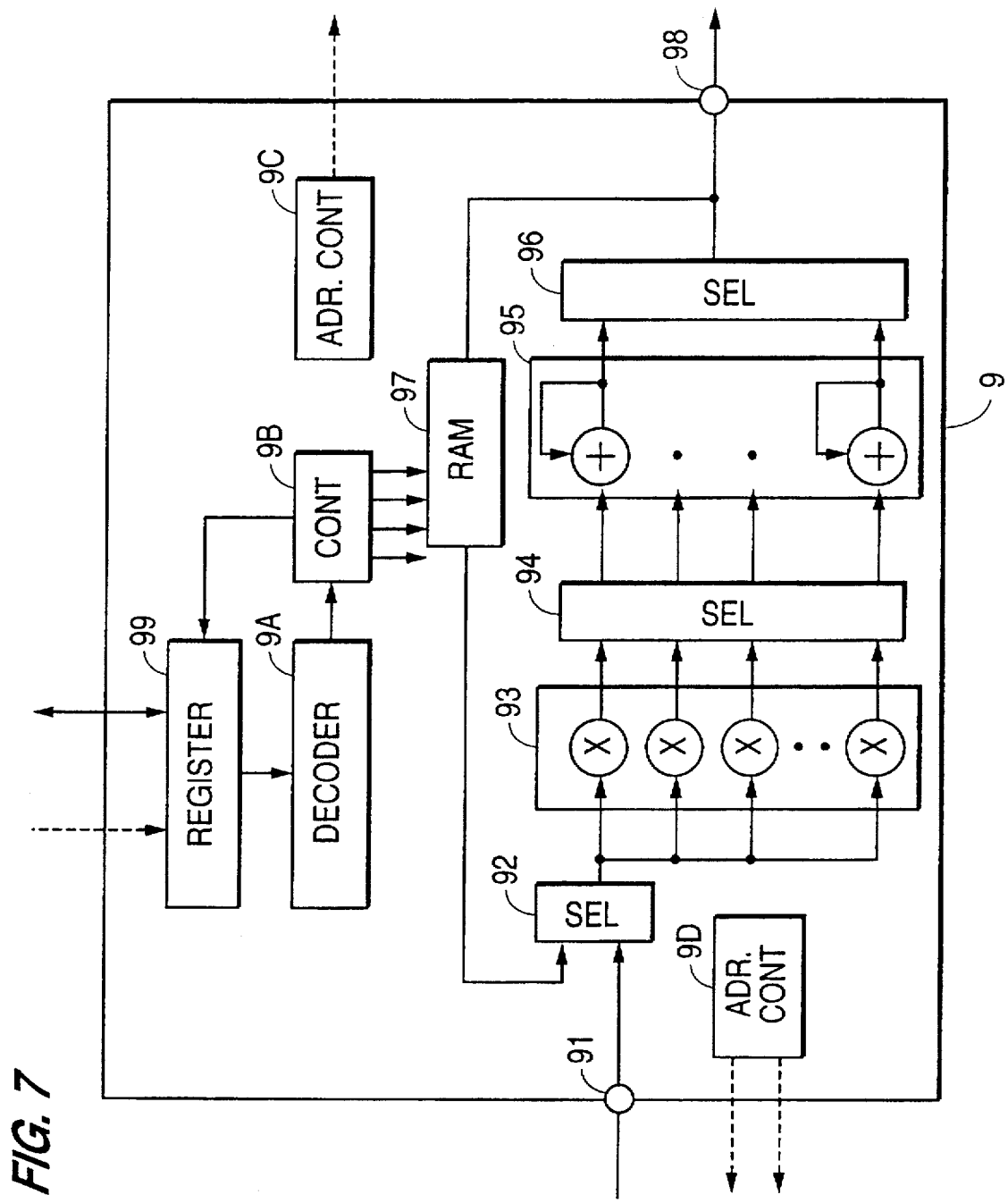
FIG. 7 is a diagram of an embodiment of the construction of a DCT dedicated module.

FIG. 7 shows the construction of the DCT circuit 9 of the dedicated data processing circuit 11. This embodiment is shown in a block diagram for realizing a two-dimensional DCT by performing a one-dimensional DCT twice. The image data inputted to an input port 91 are multiplied by a DCT transformation coefficient by a multiplier 93, and the products are accumulated through a selector (SEL) 94 in an accumulator 95. The value accumulated by a predetermined number is written through a selector (SEL) 96 in an inverted RAM 97. The operations described above belong to the one-dimensional DCT. The inverted RAM 97 rearranges and outputs the data to a selector 92, and the aforementioned operations are conducted once more to complete the two-dimensional DCT so that the image data (e.g., the DCT coefficient) are outputted to an output port 98. These operations are controlled by a control unit including an interface register 99 for interfacing with the data processing system, an instruction decoder 9A for decoding instructions stored in the interface register 99, a controller 9B for outputting signals in response to the instruction decoder 9A, and memory address generators 9C and 9D for addressing inputting and outputting memory. The interface register 99 is mapped on the aforementioned memory map.

Figure 8:
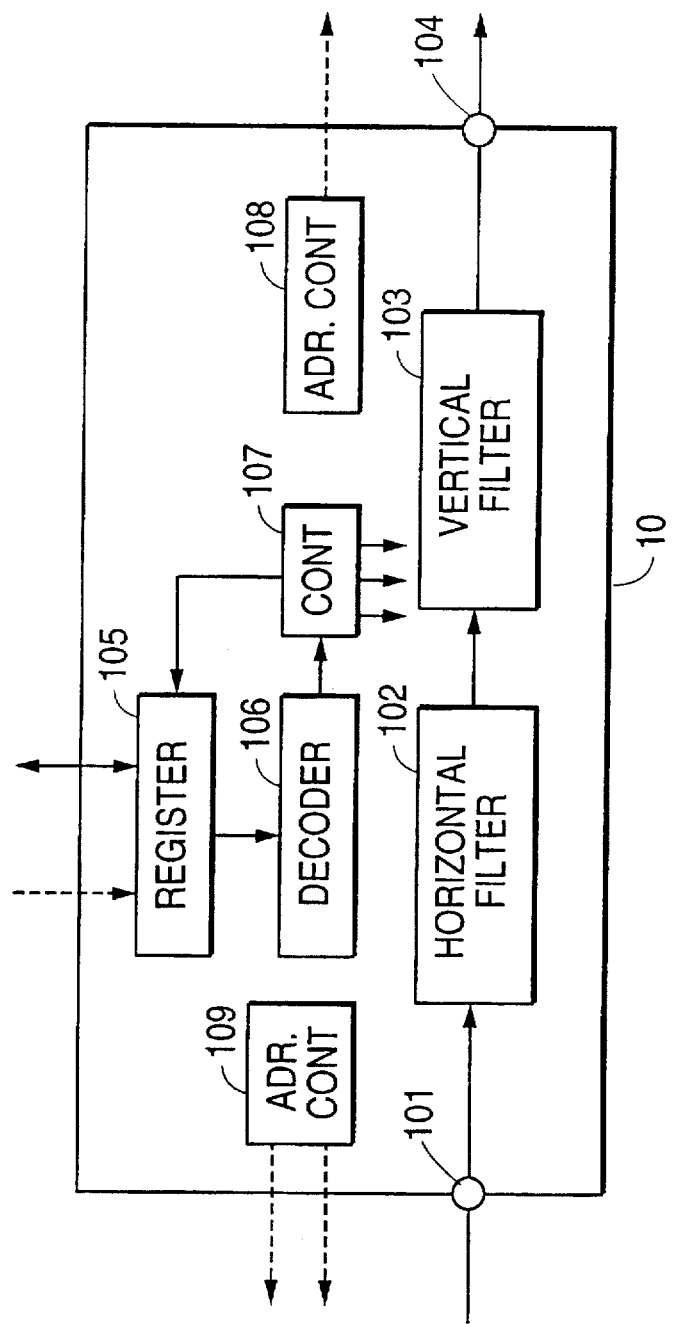
FIG. 8 is a diagram of an embodiment of the construction of an FLT dedicated module.

FIG. 8 shows the construction of the FLT circuit 10 of the dedicated data processing circuit 11. This embodiment realizes a two-dimensional filter by horizontal and vertical filtering operations. The image data inputted to an input port 101 are horizontally filtered at first by a horizontal filter 102 and then vertically filtered by a vertical filter 103 until they are outputted to an output port 104. An operation control system of the FLT circuit 10 includes an interface register 105 for interfacing with the data processing system, an instruction decoder 106 for decoding instructions stored in the interface register 105, a controller 107 for outputting signals in response to the instruction decoder 106, and memory address generators 108 and 109 for addressing inputting and outputting memories. The interface register 105 is mapped on the aforementioned memory map.

The dedicated data processing circuit 11 includes not only the DCT circuit 9 and the FLT circuit 10 but may also include a number of circuits such as a motion compensating circuit, a pattern matching circuit, a variable length coded circuit or a variable length decoded circuit.

Figure 9:
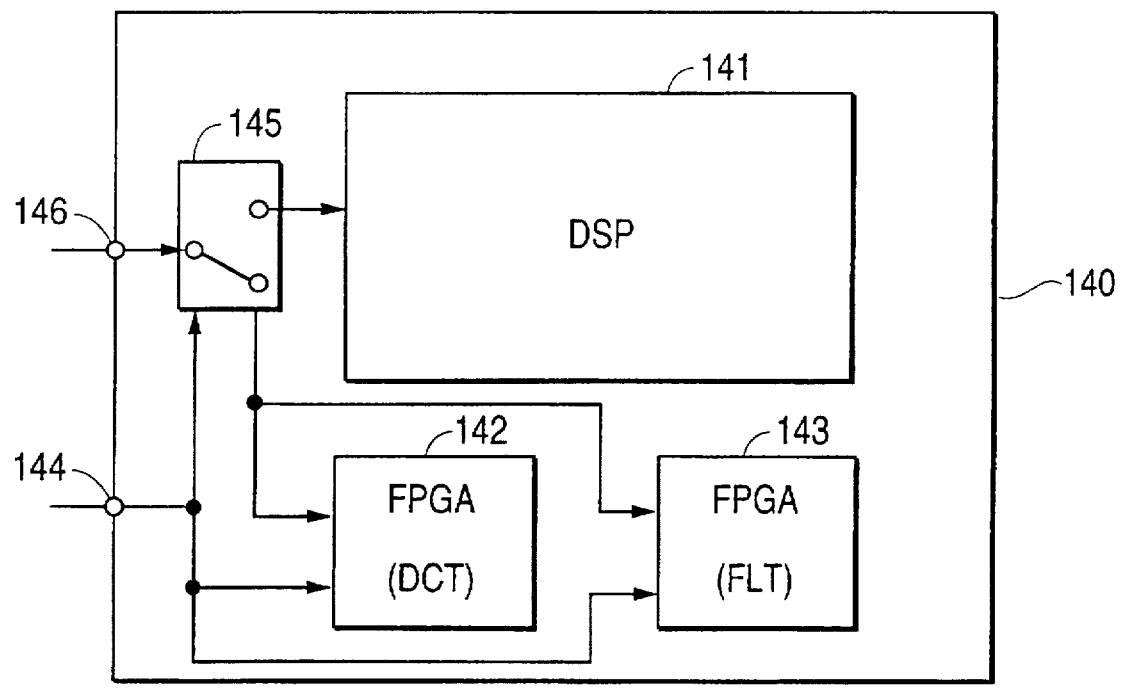
FIG. 9 is a diagram of an embodiment of the construction having a dedicated circuit of FPGA.
Figure 10:
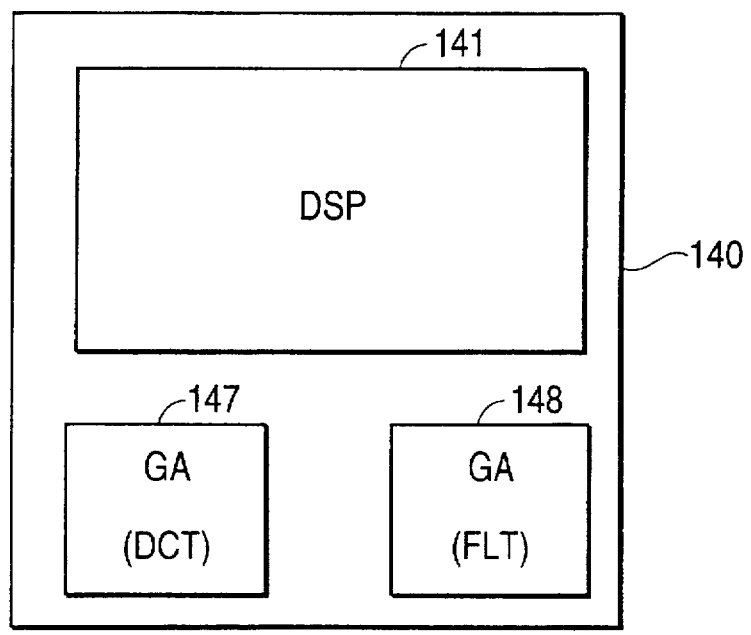
FIG. 10 is a diagram of an embodiment of the construction in which the dedicated circuit is realized by a gate array.

FIGS. 9 and 10 show examples of the manner in which the data processing system of the present invention are constructed on a semiconductor chip 140. These examples illustrate the case in which the data processing system is formed on a single silicon semiconductor substrate 140. In case the present data processing system is to be formed on a single semiconductor substrate 140, this can be implemented either by utilizing the so-called "cell based IC" or by full custom design.

FIG. 9 presents an embodiment in which a data processor 141 is constructed on the same chip 140 as the dedicated data processing circuit 11 which is constructed of Field Programmable Gate Arrays (FPGA) 142 and 143 capable of having their logic contents electrically rewritten from outside of the chip 140. The circuit of FIG. 9 includes an FPGA rewrite control port 144 and a switch 145. When the circuit of the FPGA is to be changed, the switch 145 is switched to input a FPGA circuit signal from an input port 146 by establishing the FPGA rewrite mode by inputting a control signal to the FPGA rewrite control port 144. Using the FPGA circuit signal from input port 146 the circuit constructions of the FPGA 142 and 143 of the dedicated data processing circuit 11 are set.

FIG. 10 illustrates another embodiment in which only the dedicated data processing circuit 11 is realized by gate arrays. By composing only the dedicated data processing 11 circuit of gate arrays 147 and 148, the embodiment of FIG. 10 can quickly respond to a data processing system 141 involving various processing operations.

Figure 11:
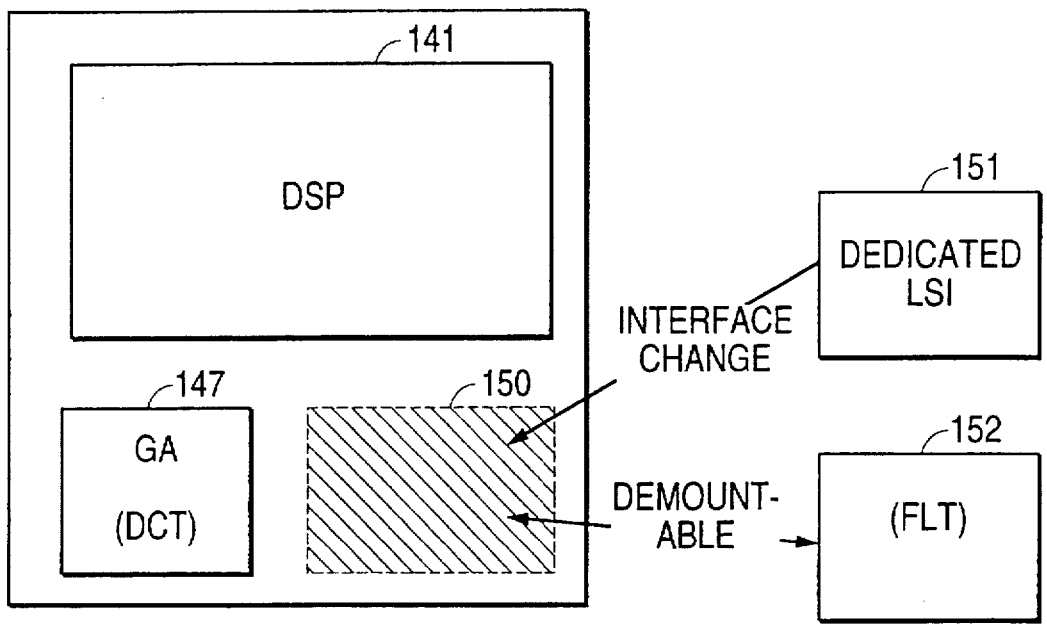
FIG. 11 is a diagram of an embodiment of an applied construction.
Figure 12:
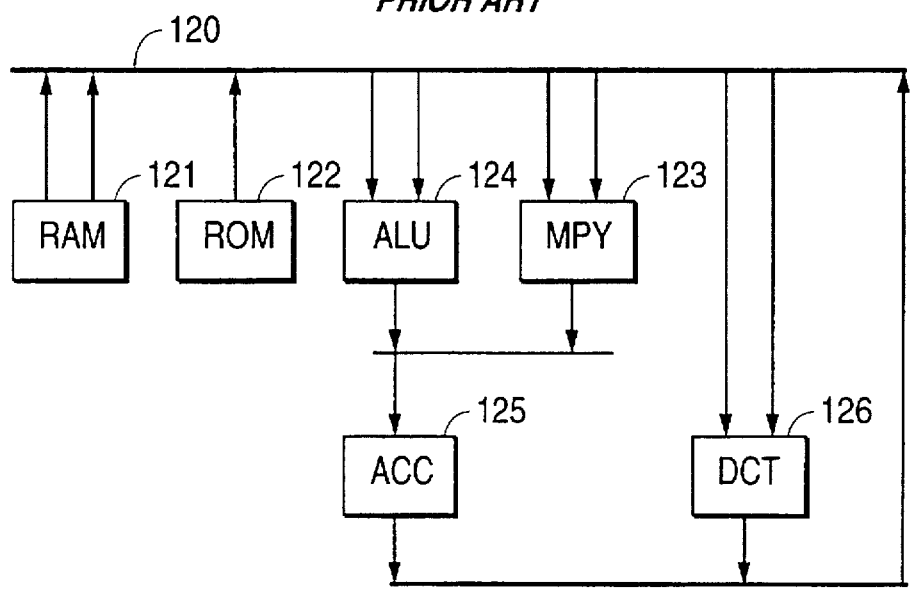
FIG. 12 is a diagram of a conventional processing portion of a data processor having a dedicated arithmetic logic unit.
Figure 13:
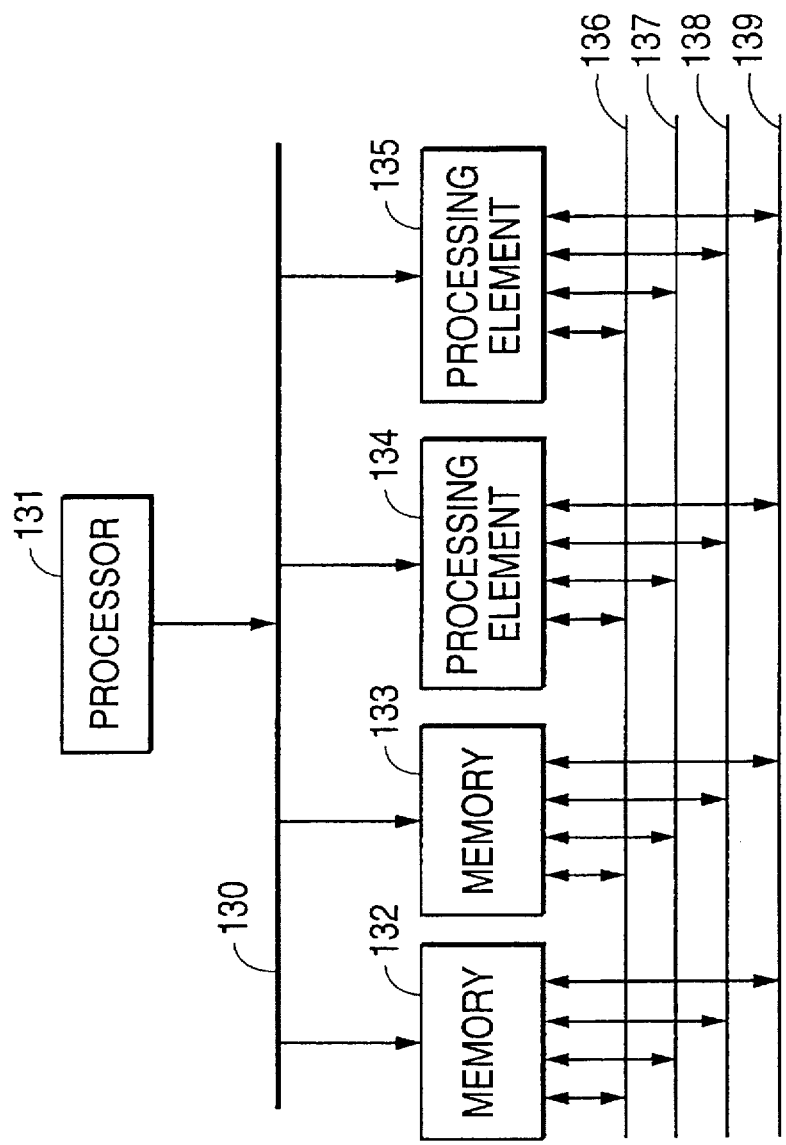
FIG. 13 is a diagram of a conventional data processing system having several dedicated buses.

FIG. 11 shows an embodiment in which a layout position 150 on the chip of the dedicated data processing circuit 11 on the data processing system is decided in advance. By thus deciding the layout position in advance, another dedicated LSI 151 can be easily laid out on the chip merely by changing the interface specifications when it is to be utilized as the dedicated data processing circuit as in the present data processing system. Moreover, a change to another dedicated data processing circuit 109 can be easily made without exerting any influence upon the other portions of the data processing system.

According to the data processing system of the present invention, the data bus of the processor is not occupied by the processing of image data thereby enhancing the degree of parallel processing between the fundamental function of the processor and the dedicated data processing circuit and between each of plural dedicated data processing circuits so that high speed data processing can be achieved. Moreover, since the inputting/outputting of the image data to be processed or having been processed by the dedicated data processing circuit are carried out by the memories controlled by the data processor and since the controls of starting or halting the dedicated data processing circuit are mapped in the memory address space of the data processor, the dedicated data processing circuit can be changed without changing the instruction system of the data processor.

We claim:

1. A data processing system, comprising:

a data processor for processing data;

a first memory for storing data;

a second memory for storing data;

a circuit for performing a predetermined operation on data;

a first bus, connected to said data processor and said first and second memories, for transferring processed data from said data processor to said first memory and for transferring data operated on by said circuit from said second memory to said data processor; and a second bus, independent of said first bus and connected to said circuit and said first memory, for transferring processed data from said first memory to said circuit; and a third bus, independent of said first bus and said second bus and connected to said circuit and said second memory for transferring data operated on by said circuit from said circuit to said second memory;

wherein said first memory includes a random port connected to said first bus and said second memory includes a random port connected to said first bus.

2. A data processing system according to claim 1, wherein said circuit is a discrete cosine transform circuit which fetches image data from said first memory to subject said image data to a discrete cosine transform and outputs a discrete cosine transform coefficient.

3. A data processing system according to claim 2, wherein said discrete cosine transform circuit performs a two dimensional discrete cosine transform by performing a one dimensional discrete cosine transform twice, said discrete cosine transform circuit includes:

an input port for inputting image data, a multiplier for multiplying said image data by a discrete cosine transform coefficient, an accumulator for accumulating multiplied image data from said multiplier, a memory for storing a predetermined amount of said accumulated image data as one dimensional discrete cosine transformed data, and control means for controlling operation of said multiplier, said accumulator and said memory in response to instructions from said data processor on an address bus and causing said one dimensional discrete cosine transformed data stored in said memory to be input to said multiplier and then said accumulator so as to output to an output port two dimensional discrete cosine transformed data.

4. A data processing system according to claim 1, wherein said data processor comprises:

an instruction memory for storing an instruction to executed; and a processing unit for executing said instruction stored in said instruction memory, wherein said circuit performs said predetermined operation on data resulting from execution by said processing unit.

5. A data processing system according to claim 1, wherein said circuit comprises:

a plurality of sub-circuits connected in series for sequentially performing operations on said processed data from said first memory.

6. A data processing system according to claim 1, wherein said first memory has a serial port for outputting processed data serially to said circuit.

7. A data processing system according to claim 1, wherein said second memory comprises:

a selector for selectively switching between a connection with said first bus and a connection with said second bus.

8. A data processing system according to claim 1, wherein said second memory further comprises a serial port for receiving data from said third bus.

9. A data processing system according to claim 1, wherein said first memory comprises:

two memories, wherein when a first one of said two memories is connected to said first bus, a second one of said two memories is connected to said second bus.

10. A data processing system according to claim 1, wherein said second memory comprises:

two memories, wherein when a first one of said two memories is connected to said first bus, a second one of said two memories is connected to said third bus.

11. A data processing system according to claim 1, wherein an address signal output from said data processor is fed through an address bus to said circuit, and wherein said circuit has its operating state controlled in response to said address signal fed through said address bus.

12. A data processing system according to claim 1, wherein said circuit is constructed so that logic circuitry of said circuit can be electrically changed to perform another predetermined operation.

13. A data processing system according to claim 12, wherein said circuit comprises:

a control port for receiving a control signal indicating whether or not said logic circuitry of said circuit is to be changed; and a switch for selecting which of said data processor and said circuit is to be supplied with an input signal coming from outside of said system based on said control signal received by said control port.

14. A data processing system according to claim 1, wherein said circuit, said data processor and said memory are formed on a single semiconductor substrate; and wherein said circuit is arranged separately in a position different from that of said data processor on said semiconductor substrate.

15. A data processing system, comprising:

a data processor for processing data;

a memory for storing data;

a circuit for performing a predetermined operation on data and outputting data operated by said circuit to said data processor;

a first bus, connected to said data processor and said memory, for transferring processed data from said data processor to said memory; and a second bus, independent of said first bus and connected to said circuit and first said memory, for transferring processed data from said memory to said circuit;

wherein said memory comprises two memories, wherein when a first one of said two memories is connected to said first bus, a second one of said two memories is connected to said second bus and vice versa.

16. A data processing system according to claim 15, wherein said circuit is a discrete cosine transform circuit which fetches image data from said memory to subject said image data to a discrete cosine transform and outputs a discrete cosine transform coefficient.

17. A data processing system according to claim 16, wherein said discrete cosine transform circuit performs a two dimensional discrete cosine transform by performing a one dimensional discrete cosine transform twice, said discrete cosine transform circuit includes:

an input port for inputting image data, a multiplier for multiplying said image data by a discrete cosine transform coefficient, an accumulator for accumulating multiplied image data from said multiplier, a memory for storing a predetermined amount of said accumulated image data as one dimensional discrete cosine transformed data, and control means for controlling operation of said multiplier, said accumulator and said memory in response to an instruction from said data processor on an address bus and causing said one dimensional discrete cosine transformed data stored in said memory to be input to said multiplier and then said accumulator so as to output to an output port two dimensional discrete cosine transformed data.

18. A data processing system according to claim 15, wherein said data processor comprises:

an instruction memory for storing an instruction to executed; and a processing unit for executing said instruction stored in said instruction memory, wherein said circuit performs said predetermined operation on data resulting from execution by said processing unit.

19. A data processing system according to claim 15, wherein said circuit comprises:

a plurality of sub-circuits connected in series for sequentially performing operations on said processed data from said memory.

20. A data processing system according to claim 15, wherein an address signal output from said data processor is fed through an address bus to said circuit, and wherein said circuit has its operating state controlled in response to said address signal fed through said address bus.

21. A data processing system according to claim 15, wherein said circuit is constructed so that logic circuitry of said circuit can be electrically changed to perform another predetermined operation.

22. A data processing system according to claim 21, wherein said circuit comprises:

a control port for receiving a control signal indicating whether or not said logic circuitry of said circuit is to be changed; and a switch for selecting which of said data processor and said circuit is to be supplied with an input signal coming from outside of said system based on said control signal received by said control port.

23. A data processing system according to claim 15, wherein said circuit, said data processor and said memory are formed on a single semiconductor substrate; and wherein said circuit is arranged separately in a position different from that of said data processor on said semiconductor substrate.

24. A data processing system, comprising:

a data processor for processing data;

a first memory for storing data;

a second memory for storing data;

a third memory for storing data;

a first and second circuits for performing predetermined operations on data;

a first data bus, connected to said data processor and said first, second and third memories, for transferring processed data from said data processor to said first memory and for transferring data operated on by said first and second circuits from said second and third memories to said data processor;

a second bus, independent of said first bus and connected to said first circuit and said first memory, for transferring processed data from said first memory to said first circuit;

a third bus, independent of said first bus and connected to said first circuit and said second memory, for transferring data operated on by said first circuit from said first circuit to said second memory;

a fourth bus, independent of said first bus and connected to said second memory and said second circuit for transferring data operated by said first circuit from said second memory and second circuit; and a fifth bus, independent of said first bus and connected to said second circuit and said third memory for transferring data operated on by said second circuit from said second circuit to said third memory.

25. A data processing system according to claim 24, wherein said first circuit is a discrete cosine transform circuit which fetches image data from said first memory to subject said image data to a discrete cosine transform and outputs a discrete cosine transform coefficient.

26. A data processing system according to claim 25, wherein said discrete cosine transform circuit performs a two dimensional discrete cosine transform by performing a one dimensional discrete cosine transform twice, said discrete cosine transform circuit includes:

an input port for inputting image data, a multiplier for multiplying said image data by a discrete cosine transform coefficient, an accumulator for accumulating multiplied image data from said multiplier, a memory for storing a predetermined amount of said accumulated image data as one dimensional discrete cosine transformed data, and control means for controlling operation of said multiplier, said accumulator and said memory in response to an instruction from said data processor on an address bus and causing said one dimensional discrete cosine transformed data stored in said memory to be input to said multiplier and then said accumulator so as to output an output port two dimensional discrete cosine transformed data.

27. A data processing system according to claim 24, wherein said second circuit is a filter circuit which fetches image data from said second memory and subjects said image data to a filtering operation and outputs filtered data.

28. A data processing system according to claim 27, wherein said filter circuit performs two dimensional filtering on said image data, said filter circuit includes:

an input port for inputting image data, a horizontal filter for horizontally filtering said image data from said input port, a vertical filter for vertically filtering horizontally filtered image data from said horizontal filter, an output port for outputting filtered data from said vertical filter, and control means for controlling operation of said horizontal and vertical filters in response to instructions from said data processor on an address bus.

29. A data processing system according to claim 24, wherein said data processor comprises:

an instruction memory for storing an instruction to executed; and a processing unit for executing said instruction stored in said instruction memory, wherein said circuit performs said predetermined operation on data resulting from execution by said processing unit.

30. A data processing system according to claim 24, wherein said first memory has a serial port for outputting processed data serially to said first circuit.

31. A data processing system according to claim 24, wherein said first memory includes a random port connected to said first data bus.

32. A data processing system according to claim 24 wherein said second memory comprises:

a selector for selectively switching between a connection with said first bus and a connection with said third bus; and a serial port for serially outputting data stored in said second memory.

33. A data processing system according to claim 24, wherein said second memory comprises:

a first serial port for receiving data from said third bus;

a second serial port for serially outputting data stored in said second memory; and a random port connected to said first bus.

34. A data processing system according to claim 24, wherein said first memory comprises:

two memories, wherein when a first one of said two memories is connected to said first bus, a second one of said two memories is connected to said second bus and vice versa.

35. A data processing system according to claim 24, wherein said third memory comprises:

a selector for selectively switching between a connection with said first bus and a connection with said fifth bus.

36. A data processing system according to claim 24, wherein said third memory comprises:

a serial port for receiving data from said fifth bus; and a random port connected to said first bus.

37. A data processing system according to claim 24, wherein said second memory comprises:

two memories, wherein when a first one of said two memories is connected to said first bus, a second one of said two memories is connected to said third bus or said fourth bus or vice versa.

38. A data processing system according to claim 24, wherein said third memory comprises:

two memories, wherein when a first one of said two memories is connected to said first bus, a second one of said two memories is connected to said fifth bus and vice versa.

39. A data processing system according to claim 24, wherein an address signal output from said data processor is fed through an address bus to said first or said second circuits, and wherein said first or said second circuits has its operating state controlled in response to said address signal fed through said address bus.

40. A data processing system according to claim 24, wherein each of said first and second circuits is constructed so that logic circuitry of said each circuit can be electrically changed to perform another predetermined operation.

41. A data processing system according to claim 40, wherein said each circuit comprises:

a control port for receiving a control signal indicating whether or not said logic circuitry of said each circuit is to be changed; and a switch for selecting which of said data processor and said each circuit is to be supplied with an input signal coming from outside of said system based on said control signal received by said control port.

42. A data processing system according to claim 24 wherein said first and second circuits, said data processor and said first, second and third memories are formed on a single semiconductor substrate; and wherein said first and second circuits are arranged separately in a position different from that of said data processor on said semiconductor substrate.

43. A data processing system comprising:

a data processor for processing data;

a first memory for storing data;

a second memory for storing data;

a circuit for performing a predetermined operation on data;

a first bus, connected to said data processor and said first and second memories, for transferring processed data from said data processor to said first memory and for transferring data from said second memory to said data processor;

a second bus, independent of said first bus and connected to said circuit and said first memory, for transferring processed data from said first memory to said circuit; and a third bus, independent of said first bus and of said second bus and connected to said circuit and said second memory, for transferring processed data operated by said circuit from said circuit to said second memory:

wherein said second bus is a dedicated bus which, transfers data, exclusively, between said first memory and said circuit and said third bus is a dedicated bus which transfers data, exclusively, between said circuit and said second memory.

44. A data processing system according to claim 43, wherein said circuit is a discrete cosine transform circuit which fetches image data from said first memory to subject said image data to a discrete cosine transform and outputs a discrete cosine transform coefficient.

45. A data processing system according to claim 43, wherein said data processor comprises:

an instruction memory for storing an instruction to be executed; and a processing unit for executing said instruction stored in said instruction memory, wherein said circuit performs said predetermined operation on data resulting from execution by said processing unit.

46. A data processing system according to claim 43, wherein said circuit comprises:

a plurality of sub-circuits connected in series for sequentially performing operations on said processed data from said first memory.

47. A data processing system according to claim 43, wherein said first memory has a serial port for outputting processed data serially to said circuit.

48. A data processing system according to claim 43, wherein said first memory includes a random port connected to said first bus.

49. A data processing system according to claim 43, wherein said second memory comprises:

a selector for selectively switching between a connection with said first bus and a connection with said second bus.

50. A data processing system according to claim 43, wherein said second memory comprises;

a serial port for receiving data from said third bus; and a random port connected to said first bus.

51. A data processing system according to claim 43, wherein said first memory comprises:

two memories, wherein when a first one of said two memories is connected to said first bus, a second one of said two memories is connected to said second bus.

52. A data processing system according to claim 43, wherein said second memory comprises:

two memories, wherein when a first one of said two memories is connected to said first bus, a second one of said two memories is connected to said third bus.

53. A data processing system according to claim 43, wherein an address signal output from said data processor is fed through an address bus to said circuit, and wherein said circuit has its operating state controlled in response to said address signal fed through said address bus.

54. A data processing system according to claim 43, wherein said circuit is constructed so that logic circuitry of said circuit can be electrically changed to perform another predetermined operation.

55. A data processing system according to data 54, wherein said circuit comprises:

a control port for receiving a control signal indicating whether or not said logic circuitry of said circuit is to be changed, and a switch for selecting which of said data processor and said circuit is to be supplied with an input signal coming from outside of said system based on said control signal received by said control port.

56. A data processing system according to claim 43, wherein said circuit, said data processor and said memory are formed on a single chip semiconductor substrate; and wherein said circuit is arranged separately in a position different from that of said data processor on said semiconductor substrate.

57. A data processing system according to claim 43, wherein said first memory includes a random port connected to said first bus and said second memory includes a random port connected to said first bus.

58. A data processing system according to claim 57, wherein said circuit is a discrete cosine transform circuit which fetches image data from said first memory to subject said usage data to a discrete cosine transform and outputs a discrete cosine transform coefficient.

59. A data processing system according to claim 57 wherein said data processor comprises:

an instruction memory for storing an instruction to be executed, and a processing unit for executing said instruction stored in said instruction memory, wherein said circuit performs said predetermined operation on data resulting from execution by said processing unit.

60. A data processing system according to claim 57, wherein said circuit comprises:

a plurality of sub-circuits connected in series for sequentially performing operations on said processed data from said first memory.

61. A data processing system according to claim 57, wherein said first memory has a serial port for outputting processed data serially to said circuit.

62. A data processing system according to claim 57, wherein said second memory comprises:

a selector for selectively switching between a connection with said first bus and a connection with said second bus.

63. A data processing system according to claim 57, wherein said second memory has a serial port for receiving data from said third bus.

64. A data processing system according to claim 57, wherein said first memory comprises:

two memories, wherein when a first one of said two memories is connected to said first bus, a second one of said two memories is connected to said third bus.

65. A data processing system according to claim 57, wherein said second memory comprises:

two memories, wherein where a first one of said two memories is connected to said first bus, a second one of said two memories is connected to said third bus.

66. A data processing system according to claim 57, wherein an address signal output from said data processor is fed through an address bus to said circuit, and wherein said circuit has its operating state controlled in response to said address signal fed through said address bus.

67. A data processing system according to claim 57, wherein said circuit is constructed so that logic circuit of said circuit can be electrically changed to perform another predetermined operation.

68. A data processing system according to claim 67, wherein said circuit comprises:

a control port for receiving a control signal indicating whether or not said logic circuitry of said circuit is to be changed; and a switch for selecting which of said data processor and said circuit is to be supplied with an input signal coming from outside of said system based on said control signal received by said control port.

69. A data processing system according to claim 57, wherein said circuit said data processor and said memory are formed on a single chip semiconductor substrate; and wherein said circuit is arranged separately in a position different from that of said data processor on said semiconductor substrate.

\* \* \* \* \*